United States Patent Office

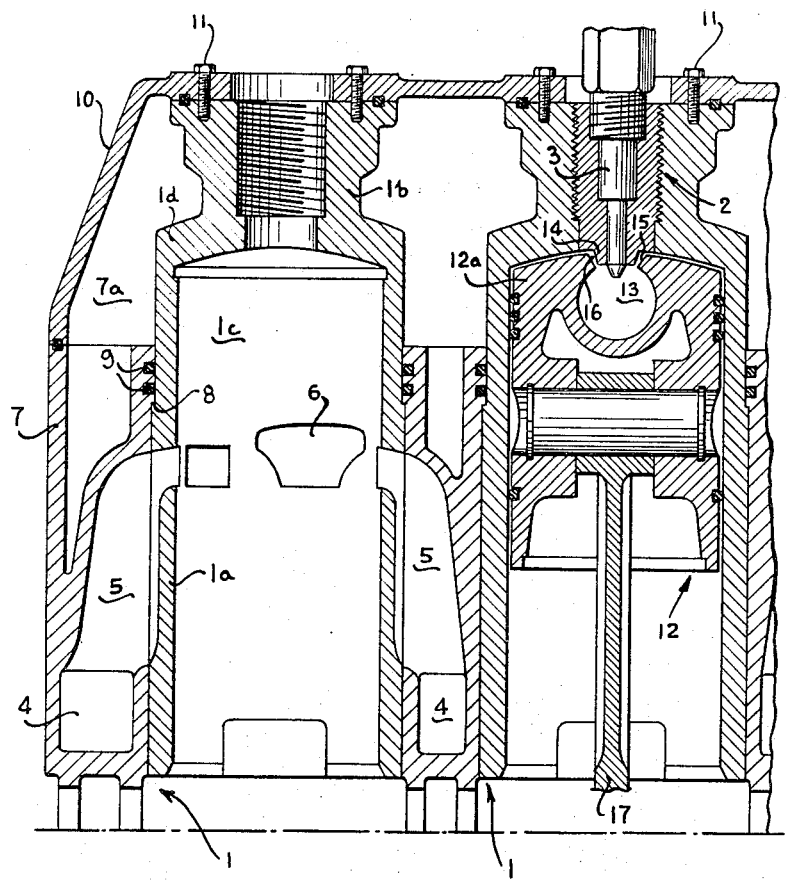

3,379,179
Patented Apr. 23, 1968

3,379,179
INTERNAL COMBUSTION ENGINE
Albrecht Wolfgang, Mantzel, Ingolstadt (Danube),
Germany, assignor to Inpaco Trust Reg., Vaduz,
Liechtenstein
Filed June 8, 1965, Ser. No. 462,235
Claims priority, application Germany, June 9, 1964,
J 26,001
9 Claims. (Cl. 123—65)

The present invention relates to internal combustion engines in general, and more particularly to improvements in two-cycle engines, especially Diesel engines.

It is an important object of my invention to provide a very simple, lightweight and exceptionally compact two-cycle Diesel engine which may be produced at low cost.

Another object of the invention is to provide a novel multi-cylinder two-cycle internal combustion engine and to provide such engine with an improved system for evacuation of combustion products and with a novel cooling system.

A further object of the invention is to provide an engine of the above outlined characteristics wherein the cylinders and their pistons are constructed with a view to avoid pressure peaks, to insure very smooth operation, to reduce noise and wear, and to increase the output.

An additional object of the invention is to provide a Diesel engine which is just as noiseless as an equivalent Otto engine and whose output at least approximates the output of an Otto engine having the same dimensions.

A concomitant object of the invention is to provide a novel arrangement for rapidly and efficiently evacuating combustion products from the cylinder chambers of Diesel engines which embody the above outlined features and advantages.

Still another object of the invention is to provide a novel type of cylinder and fuel injection nozzles which may be utilized in a two-cycle Diesel engine of the above outlined characteristics.

A further object of the invention is to provide a two-cycle Diesel engine wherein the curve which is representative of pressures prevailing in the cylinder chambers approximates an ideal pressure curve, and wherein the currents of air which expel combustion products and thereupon fill the cylinder chambers may be circulated by resorting to a very compact and lightweight air circulating and conveying system.

Another object of the instant invention is to provide a two-cycle Diesel engine wherein the currents of air which expel combustion products from the cylinder chambers simultaneously serve to cool substantial portions of the corresponding cylinders and wherein the speed and direction of such air currents may be controlled with utmost accuracy.

A further object of my present invention is to provide a two-cycle internal combustion engine wherein jets of fuel may be mixed with air in such a way that the consumption of both ingredients can be reduced to a minimum without affecting the efficiency of the engine and by resorting to a very simple, compact and long-lasting intermixing arrangement.

Briefly stated, one feature of my invention resides in the provision of a two-cycle internal combustion engine comprising a plurality of cylinders each of which defines a cylinder chamber and is provided with an annular cylinder head at one end thereof and a casing surrounding the cylinders and defining a plurality of preferably annular distributor compartments each of which is located at and preferably surrounds the other end of a cylinder. The housing further defines a plurality of air-conveying channels or ducts which preferably extend in the axial direction of the cylinders and communicate with the corresponding compartments. The channels discharge into the respective cylinder chambers in zones which are located intermediate, and preferably substantially midway between, the ends of the associated cylinders so that the currents of air can be accelerated and oriented while flowing through said channels to rapidly and efficiently expel combustion products from the corresponding cylinder chambers at the time the pistons perform return strokes.

Another important feature of my invention resides in the provision of specially configurated outlets through which the combustion products are expelled from the cylinder chambers and in the provision of specially configurated annular housings or seats for fuel injection nozzles which extend beyond the cylinder heads and into the respective cylinder chambers so that a portion of each housing may project into and may define an annular gap with the surface surrounding the inlet of a preferably spherical combustion chamber provided in the crown of the respective piston. The cross-sectional areas of such annular gaps will vary in response to reciprocation of the pistons whereby the entry of air into and escape of combustion products from the combustion chambers is automatically controlled in such a way that the incoming air is thoroughly intermixed with injected fuel and that the products of combustion cannot generate undesirable pressure peaks when the pistons perform return strokes.

The novel features which are considered as characteristic of the invention are set forth in particular in the appended claims. The improved two-cycle internal combustion engine itself, however, both as to its construction, its mode of operation and the mode of assembling the same, together with additional features and advantages thereof, will be best understood upon perusal of the following detailed description of a specific embodiment with reference to the accompanying drawing the single illustration of which is an axial section through two cylinders of a multi-cylinder Diesel engine embodying one form of my invention. It will be noted that the piston for the left-hand cylinder was omitted from the drawing for the sake of clarity.

Referring to the drawing, there is shown a portion of a multi-cylinder two-cycle Diesel engine having two banks of one-piece cylinders 1 each of which comprises a sleeve-like main body portion 1a having an internally threaded extension or nipple 1b at one of its ends to receive the externally threaded annular housing or seat 2 of a fuel injection nozzle 3. The drawing shows only one cylinder of each bank, and it will be seen that the other end of each cylinder 1 is surrounded by an annular distributor compartment 4 serving to receive, to store and to distribute air which is utilized to expel combustion products from the respective cylinder chamber 1c. Each compartment 4 communicates with five equidistant channels or ducts 5 which convey air in the axial direction of the respective sleeve 1a and toward but short of the corresponding cylinder head 1d. The outlets 6 through which the combustion products escape from the cylinder chambers 1c are of special configuration, and one thereof is shown in the left-hand part of the drawing.

The cylinders 1 are accommodated in a casing which comprises two halves or shells 7 having internal shoulders or stops 8 serving to locate the sleeves 1a in requisite positions by abutting against complementary shoulders or stops provided on the cylinders. During insertion into the casing, the cylinders 1 are moved upwardly, as viewed in the drawing, and the internal surfaces of the shells 7 are formed with grooves which receive sealing elements 9 in the form of cords or ropes consisting of asbestos or the like. These sealing elements 9 prevent leakage of air from the compartments 4 into coolant containing spaces 7a or vice versa. The coolant is normally water and the spaces 7a surround the cylinder heads 1d and their extensions 1b. The casing of the engine further comprises an apertured cover or cap 10 which surrounds the spaces 7a and is secured to the free end faces of the extensions 1b by screws or bolts 11 or by similar fasteners.

The crown 12a of each piston 12 is provided with a spherical combustion chamber 13 and the pistons cooperate with the corresponding housings 2 which are configurated in such a way as to prevent pressure peaks when the engine is in actual use. Each housing 2 is provided with an inwardly extending terminal portion or tip 14 which is bounded by a conical, convex or concave surface projecting inwardly beyond the cylinder head 1d and into the circular inlet 15 of the combustion chamber 13. The crown 12a of each piston 12 defines with the corresponding tip 14 and annular clearance or gap 16 whose cross-sectional area varies in response to reciprocation of the piston in its chamber 1c. In other words, the tips 14 extend into the inlets 15 with a certain clearance and the exact shape of the gaps 16 which surround such tips 14 when the corresponding pistons 12 complete their compression strokes will depend on the configuration of surfaces which surround the tips 14 and also on the configuration of surfaces which surround the inlets 15. Depending on the desired mode of operation of the engine, such surfaces may be of conical, convex or concave outline. In the drawing, the conicity of the surface bounding the inlet 15 is different from the conicity of the surface which surrounds the tip 14. The aforementioned gaps 16 are of annular shape and their cross-sectional area diminishes gradually when the pistons 12 move upwardly, as viewed in the drawing, i.e., when the pistons perform working or compression strokes. During such reduction in the cross-sectional area of the gaps 16, air which rushes into the combustion chambers 13 is highly accelerated so that it travels at a very high speed which is of advantage because such air is then intimately mixed with jets of fuel which are admitted through the respective nozzles 3. It is clear that the surfaces surrounding the tips 14 and/or the inlets 15 may be provided with helically or otherwise inclined grooves to spin the currents of inrushing air and to further enhance the intermixing of such air with the jets of fuel. The grooves will also spin the combustion products which escape from the chambers 13 when the pistons 12 perform their return strokes. It is clear that the efficiency of the engine is improved if air entering the chambers 13 is caused to form an intimate mixture with the jets of admitted fuel. The air which flows from the cylinder chambers 1c into the combustion chambers 13 is compressed between the cylinder heads 1d and the crowns 12a when the pistons 12 perform their working strokes, i.e., when the piston rods 17 move upwardly, as viewed in the drawing. The consumption of fuel is also reduced if such fuel is thoroughly intermixed with fresh air.

During ignition of the fuel-air mixture, the pressure prevailing in the combustion chambers 13 rises and the resulting combustion products escape at a high speed by flowing through the narrow annular gaps 16 and around the respective tips 14 to enter the corresponding cylinder chambers 1c. During expansion and escape of combustion products, the pistons 12 move downwardly, as viewed in the drawing, whereby the combustion products enter cylinder chambers whose volume increases gradually. Thus, the rise in pressure prevailing between the crowns 12a and cylinder heads 1d takes place gradually so that pressure peaks during return strokes of the pistons are much less pronounced than in heretofore known Diesel engines of this general character. Knocking is also reduced to a minimum, and the curve which represents variations in pressures prevailing in the cylinder chambers 1c approximates an ideal curve.

Of course, and since the improved engine produces less pronounced pressure peaks, its component parts may be of lighter, more compact and less expensive construction. As a matter of fact, the structural elements of my engine need not be heavier and/or bulkier than the component parts of an Otto engine. Also, and since the improved engine operates with a minimum of knocking, its running characteristics are more typical of a gasoline engine than of a conventional Diesel engine.

The compartments 4 at the rear or inner ends of the cylinders 1 also contribute to greater compactness and higher efficiency of my improved two-cycle Diesel engine. As stated before, the channels 5 extend substantially axially toward but short of the cylinder heads 1d and their discharge ends extend through a median zone of the respective sleeve 1a. In heretofore known engines wherein combustion products are evacuated by air flowing from compartments surrounding the cylinders, the compartments are invariably located at the level of the outlets through which the combustion products escape from the cylinder chambers so that air flowing from the compartments into the cylinder chambers has no time for acceleration and/or orientation in a desired direction. In other words, in such conventional engines the evacuation of combustion products takes place in haphazard fashion rather than in an accurately predictable manner.

By the simple expedient of providing the compartments 4 at a certain distance from the outlets 6 and by providing the channels 5 which bring about proper orientation (directed flow) and allow for strong acceleration of air currents, I insure that the sleeves 1a are thoroughly cooled, that the evacuation of combustion products from the cylinder chambers 1c takes place in an accurately predictable manner, that the evacuation of combustion products is more efficient than in heretofore known two-cycle engines, that each cylinder chamber 1c receives a higher percentage of oxygen-containing air, and that the quantity of admitted air may be reduced to a minimum because such air expels the combustion products in an accurately predictable way. In other words, the air circulating system may be of more compact design than in all such two-cycle Diesel engines which are known to me at this time.

Each outlet 6 reaches its maximum width (as seen in the circumferential direction of the respective sleeve 1a) only in a zone which is located above the discharge ends of the channels 5, i.e., in a zone which is located between the discharge ends of the channels and the respective cylinder head 1d. This is clearly shown in the left-hand portion of the drawing. It will be seen that the width of the outlet 6 is strongly reduced in that zone thereof which is located at the same level as the discharge ends of the channels 5 so that the distance between the lower (narrower) portion of the outlet 6 and the discharge ends of the adjoining channels 5 may be increased to a maximum. This reduces the likelihood that currents of air which are admitted through the channels 5 might escape into the outlet 6 without expelling at least some combustion products from the respective cylinder chambers 1c. Thus, losses in admitted air are minimal and each cylinder chamber 1c is rapidly filled with fresh air.

The provision of a relatively large number of air admitting channels 5 for each cylinder 1 also contributes to more rapid, more thorough and more efficient exacuation of combustion products and to rapid filling of each cylinder chamber with fresh oxygen-containing air. As shown in the left-hand part of the drawing, the cross-sectional areas of the channels 5 are relatively small so that each such channel brings about so-called laminar flow of air which contributes to more efficient and more rapid evacuation of combustion products. It will be seen that the improved evacuation of combustion products and rapid filling of chambers 1c with fresh air is caused by a series of novel features including placing the compartments 4 at a distance from the outlets 6, providing a relatively large number of channels 5 which convey currents of fresh air from the compartments 4 into the chambers 1c, providing the sleeves 1a with specially configured outlets 6, and placing the discharge ends of the channels 5 at a maximum distance from the adjoining narrower portions of the respective outlets.

The configuration and construction of the sleeves 1a is such that they, too, contribute to greater efficiency, lower cost and reduced weight of the improved engine. Each sleeve 1a preferably consists of a single piece of metallic material and is preferably integral with the respective cylinder head 1d and with the respective extension 1b. Thus, there is no need to provide special sealing elements between the sleeves 1a and the respective cylinder heads 1d and/or extensions 1b; therefore, the transfer of heat from the cylinder heads 1d to the sleeves 1a is much more pronounced than in engines wherein the cylinder comprises two or more separate components which must be connected to each other by interposition of one or more sealing elements to prevent uncontrolled escape of combustion products. Also, the exchange of heat between the cylinders 1 and the coolant which circulates in the spaces 7a is very satisfactory because such coolant is in direct contact with the cylinder heads and because the coolant also surrounds the extensions 1b.

It was found that the improved two-cycle engine operates with an exceptionally high efficiency, even when the pistons 12 reciprocate at a high speed. The engine is of surprisingly compact and lightweight construction. The invention may be embodied in small (so-called boxer-type) engines with parallel cylinders, in V-8 engines, and/or in engines having only four or six cylinders. The output is exceptionally high and the noise does not exceed the noise produced by an Otto engine of the V-8 type. The weight of the engine may be calculated at 2 kg./HP which is about the same as in a gasoline engine. The improved engine can be readily accommodated in automotive vehicles and requires the same amount of space as an equivalent gasoline engine; in fact, the output of my engine at least equals but can exceed the output of a gasoline engine having the same dimensions.

As regards its compactness and weight, the improved two-cycle engine is comparable to a rotary piston engine. However, as regards its sealing action, useful life and resistance to varying loads, my engine was found to be vastly superior to presently known rotary piston engines.

It is clear that the pistons 12, injection nozzles 3 and the housings 4 of my invention may be utilized in two-cycle engines wherein the compartments 4 and channels 5 are omitted, and inversely, that such compartments and channels may be used in two-cycle engines wherein the injected fuel is combusted spontaneously or in engines which comprise spark plugs or analogous igniters. In engines of the last mentioned type, the seat of each igniter is bounded by a conical, convex or concave surface which extends into a preferably spherical combustion chamber of the associated piston.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a two-cycle internal combustion engine, a plurality of cylinders each defining a chamber having a single outlet for combustion products and each having a first end provided with a head and a second end; and a casing surrounding said cylinders and defining an air-containing compartment surrounding the second end of each cylinder, said casing further defining a plurality of air-conveying channels communicating with each of said compartments, said channels extending substantially axially of the respective cylinders and having discharge ends communicating with the respective chambers in zones located between the ends of the corresponding cylinders.

2. A structure as set forth in claim 1, wherein said casing defines five channels for each of said cylinders.

3. In a two-cycle internal combustion engine, a plurality of cylinders each defining a chamber and each having a first end provided with a head and a second end, each cylinder further having a single outlet for combustion products, said outlets being located between the ends of the respective cylinders and each having a wider portion and a narrower portion respectively located nearer to and more distant from the corresponding head; and a casing surrounding said cylinders and defining an air-containing compartment surrounding the second end of each cylinder, said casing further defining a plurality of air-conveying channels extending substantially axially of the respective cylinders and communicating with each of said compartments, each of said channels having a discharge end communicating with the respective chamber at the level of only the narrower portion of the corresponding outlet.

4. A structure as set forth in claim 3, wherein the narrower portion of each outlet is located at a relatively large distance from the adjoining discharge ends of the respective channels.

5. In a two-cycle internal combustion engine, a plurality of cylinders each defining a chamber having a single outlet for combustion products and each having a first end provided with a head and a second end, each of said heads having an outwardly projecting integral annular extension; a fuel injection nozzle including a housing mounted in the extension of each cylinder head; and a casing surrounding said cylinders and defining an air-containing compartment surrounding the second end of each cylinder, said casing further defining a plurality of air-conveying channels extending substantially axially of the respective cylinders and communicating with said compartments and arranged to discharge air in laminar flow into the respective chambers between the ends of the corresponding cylinders.

6. In a two-cycle internal combustion engine, a plurality of cylinders each defining a chamber having a single outlet for combustion products and each including a sleeve having a first end provided with a head and a second end, each of said heads having an outwardly projecting integral annular extension; a fuel injection nozzle including a housing mounted in the extension of each cylinder head; and a casing surrounding said cylinders and defining an air-containing compartment surrounding the second end of each sleeve, said casing further defining a plurality of air-conveying channels extending substantially axially of the respective cylinders and communicating with said compartments and arranged to discharge air in laminar flow into the respective chambers between the ends of the corresponding sleeves.

7. In a two-cycle internal combustion engine, a plurality of one-piece cylinders each defining a chamber having a single outlet for combustion products and each including a sleeve having a first end provided with a head and a second end, each of said heads having an outwardly projecting integral annular extension; a fuel injection nozzle including a housing mounted in the extension of each cylinder head; and a casing surrounding said cylinders and defining an air-containing compartment surrounding the second end of each sleeve, said casing further defining a plurality of air-conveying channels extending substantially axially of the respective cylinders and communicating with said compartments and arranged to discharge air in laminar flow into the respective chambers between the ends of the corresponding sleeves.

8. In a two-cycle internal combustion engine, a plurality of cylinders each defining a cylinder chamber having a single outlet for combustion products and each having a first end provided with a head and a second end, each of said heads having an annular portion; a fuel injection nozzle including a housing mounted in said annular portion and having an annular terminal portion extending beyond the respective cylinder head and into the corresponding cylinder chamber; a piston reciprocably received in each of said cylinder chambers and having a crown at that end thereof which is adjacent to the respective cylinder head, each of said crowns having a combustion chamber provided with an inlet which receives with clearance the terminal portion of the respective housing, at least when the pistons are moved nearest to the corresponding heads, whereby said crowns and the respective terminal portions define between themselves annular gaps whose cross-sectional area varies in response to reciprocation of said pistons; and a casing surrounding said cylinders and defining an air-containing compartment surrounding the second end of each cylinder, said casing further defining a plurality of air-conveying channels communicating with said compartments and arranged to discharge air in laminar flow into the respective cylinder chambers between the ends of the corresponding cylinders.

9. In a two-cycle internal combustion engine, a plurality of cylinders each defining a cylinder chamber having a single outlet for combustion products and each having a first end provided with a head and a second end, each of said heads having an annular portion; a fuel injection nozzle including a housing mounted in said annular portion and having an annular terminal portion bounded by a conical surface and extending beyond the respective cylinder head and into the corresponding cylinder chamber; a piston reciprocably received in each of said cylinder chambers and having a crown at that end thereof which is adjacent to the respective cylinder head, each of said crowns having a combustion chamber provided with an inlet which receives with clearance the terminal portion of the respective housing, at least when the pistons are moved nearest to the corresponding heads, whereby said crowns and the respective terminal portions define between themselves annular gaps whose cross-sectional area varies in response to reciprocation of said pistons, each of said crowns being provided with a conical surface bounding the respective inlet and having a conicity which is different from that of the surface on the terminal portion of the corresponding housing; and a casing surrounding said cylinders and defining an air-containing compartment surrounding the second end of each cylinder, said casing further defining a plurality of air-conveying channels communicating with said compartments and arranged to discharge air in laminar flow into the respective cylinder chambers between the ends of the corresponding cylinders.

References Cited

UNITED STATES PATENTS

| | | | |
|---|---|---|---|
| 1,245,451 | 11/1917 | Fornaca | 123—41.82 |
| 1,664,782 | 4/1928 | Magdeburger | 123—41.84 |
| 1,773,413 | 8/1930 | Tobler | 123—65 |
| 2,023,403 | 12/1935 | Butler | 123—193 |
| 2,151,218 | 3/1939 | Lutz | 123—32 |

FOREIGN PATENTS

| | | |
|---|---|---|
| 713,460 | 11/1941 | Germany. |
| 349,423 | 5/1931 | Great Britain. |
| 421,101 | 12/1934 | Great Britain. |
| 448,758 | 6/1936 | Great Britain. |
| 342,042 | 8/1936 | Italy. |

WENDELL E. BURNS, *Primary Examiner.*

CARLTON R. CROYLE, *Examiner.*